US012467583B2

(12) United States Patent  (10) Patent No.: US 12,467,583 B2
Kolz et al.  (45) Date of Patent: Nov. 11, 2025

(54) FLAT PANEL DISPLAY MOUNT WITH SWIVEL FEATURE

(71) Applicant: LEGRAND AV INC., Eden Prairie, MN (US)

(72) Inventors: Justin Kolz, Eden Prairie, MN (US); Aaron Grulkowski, Eden Prairie, MN (US); Wyatt Grunerud, Eden Prairie, MN (US)

(73) Assignee: Legrand AV, Inc., Eden Prairie, MN (US)

( * ) Notice: Subject to any disclaimer, the term of this patent is extended or adjusted under 35 U.S.C. 154(b) by 201 days.

(21) Appl. No.: 17/922,249

(22) PCT Filed: Apr. 29, 2021

(86) PCT No.: PCT/US2021/029978
§ 371 (c)(1),
(2) Date: Oct. 28, 2022

(87) PCT Pub. No.: WO2021/222631
PCT Pub. Date: Nov. 4, 2021

(65) Prior Publication Data
US 2023/0184375 A1  Jun. 15, 2023

Related U.S. Application Data

(60) Provisional application No. 63/017,072, filed on Apr. 29, 2020.

(51) Int. Cl.
*F16M 11/20*  (2006.01)
*F16M 13/02*  (2006.01)

(52) U.S. Cl.
CPC ...... *F16M 13/022* (2013.01); *F16M 11/2014* (2013.01); *F16M 11/2092* (2013.01); *F16M 2200/061* (2013.01)

(58) Field of Classification Search
CPC ................. F16M 13/02; F16M 13/022; F16M 2200/061; F16M 11/2014; F16M 11/2092
(Continued)

(56) References Cited

U.S. PATENT DOCUMENTS

D494,596 S  *  8/2004  Pfister ........................... D8/380
7,448,584 B2 * 11/2008  Chen ...................... F16M 13/02
248/920

(Continued)

FOREIGN PATENT DOCUMENTS

CN  101849410 A  9/2010
CN  102859253 A  1/2013
(Continued)

OTHER PUBLICATIONS

International Search Report for PCT/US2021/029978, mailed Aug. 27, 2021 (3 pgs).
(Continued)

*Primary Examiner* — Jonathan Liu
*Assistant Examiner* — Guang H Guan
(74) *Attorney, Agent, or Firm* — Bradley J. Thorson; DeWitt LLP

(57) ABSTRACT

A wall mount includes a wall attachment assembly with spaced apart top and bottom rails. A pair of display mount assemblies hang from the wall attachment assembly and attach to a television or other electronic display such as a computer monitor. The display mount assemblies include an engaging assembly, a display mount member, a scissors assembly, and a carrier assembly. The engaging assembly has hooks and a swivel guide engaged with the top rail of the wall attachment assembly, and a latch assembly engaged with the bottom rail of the wall attachment assembly. The swivel guide and a contact portion of the latch assembly enable the display mount assemblies to swivel or pivot about (Continued)

a vertical axis relative to the wall attachment assembly. This enables an attached television or monitor to be laterally swiveled relative to the wall.

12 Claims, 11 Drawing Sheets

(58) Field of Classification Search
USPC ........ 248/917, 919, 920, 921, 922, 923, 924
See application file for complete search history.

(56) References Cited

U.S. PATENT DOCUMENTS

| | | | |
|---|---|---|---|
| 8,235,342 B2 | 8/2012 | Pfister et al. | |
| 8,456,808 B2 | 6/2013 | Grey et al. | |
| 8,490,934 B2 | 7/2013 | Dittmer | |
| 8,690,111 B2 * | 4/2014 | Huang | F16M 11/10 |
| | | | 248/371 |
| 9,109,742 B2 * | 8/2015 | Smith | F16M 11/10 |
| 9,546,756 B1 * | 1/2017 | Hung | F16M 13/02 |
| D837,225 S * | 1/2019 | Russell | D14/452 |
| 11,272,786 B2 * | 3/2022 | Pei | F16M 11/10 |
| 11,473,722 B2 * | 10/2022 | Amidei | F16M 11/18 |
| 2008/0006751 A1 | 1/2008 | Chen et al. | |
| 2011/0019344 A1 | 1/2011 | Russell et al. | |
| 2011/0102984 A1 | 5/2011 | Pfister et al. | |
| 2011/0234926 A1 | 9/2011 | Smith | |
| 2013/0032682 A1 * | 2/2013 | Bell | F16M 11/2085 |
| | | | 248/277.1 |
| 2013/0082156 A1 | 4/2013 | Conner | |
| 2023/0184375 A1 * | 6/2023 | Kolz | F16M 11/2014 |
| | | | 312/7.2 |
| 2023/0337821 A1 * | 10/2023 | Welty | F16M 11/24 |
| 2025/0067384 A1 * | 2/2025 | Xu | F16M 11/048 |

FOREIGN PATENT DOCUMENTS

| | | | |
|---|---|---|---|
| CN | 105474629 A | 4/2016 | |
| CN | 111425708 B * | 10/2020 | F16M 11/04 |
| EP | 3005687 B1 | 9/2019 | |
| KR | 10-2015-0069103 A | 6/2015 | |
| KR | 10-1949476 B1 | 2/2019 | |
| WO | 2011099999 A1 | 8/2011 | |

OTHER PUBLICATIONS

Written Opinion for PCT/US2021/029978, mailed Aug. 27, 2021 (5 pgs).
Extended European Search Report for co-related EP application No. 21796861.9, dated Apr. 17, 2024 (9 pgs).
Communication pursuant to Article 94(3) EPC for co-related EP application No. 21796861.9, dated Mar. 19, 2025 (5 pgs).
Chinese Office Action for co-related CN application No. 202180045735.4, dated Sep. 18, 2024 (11 pgs).
Chinese Office Action for co-related CN application No. 202180045735.4, dated Feb. 17, 2025 (6 pgs).

* cited by examiner

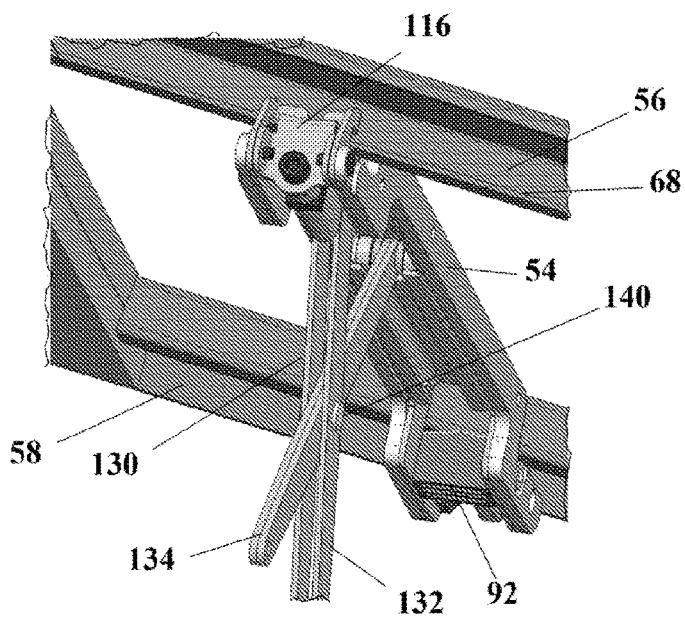
Fig. 6
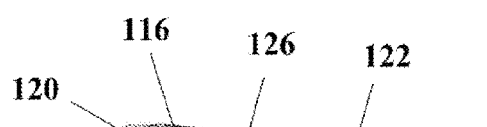
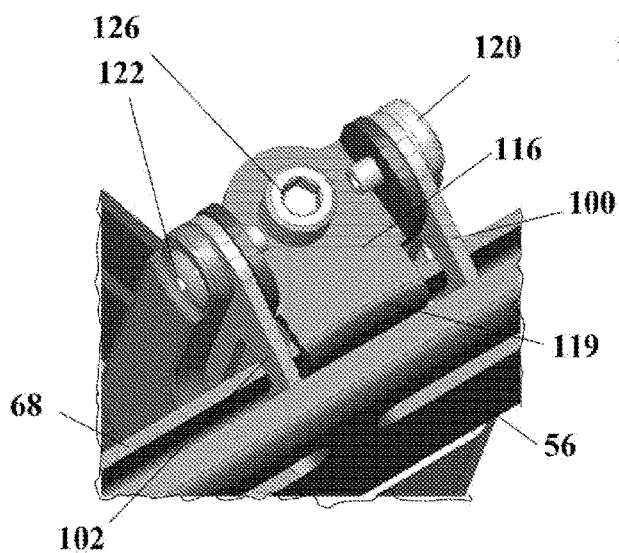
Fig. 7
Fig. 8

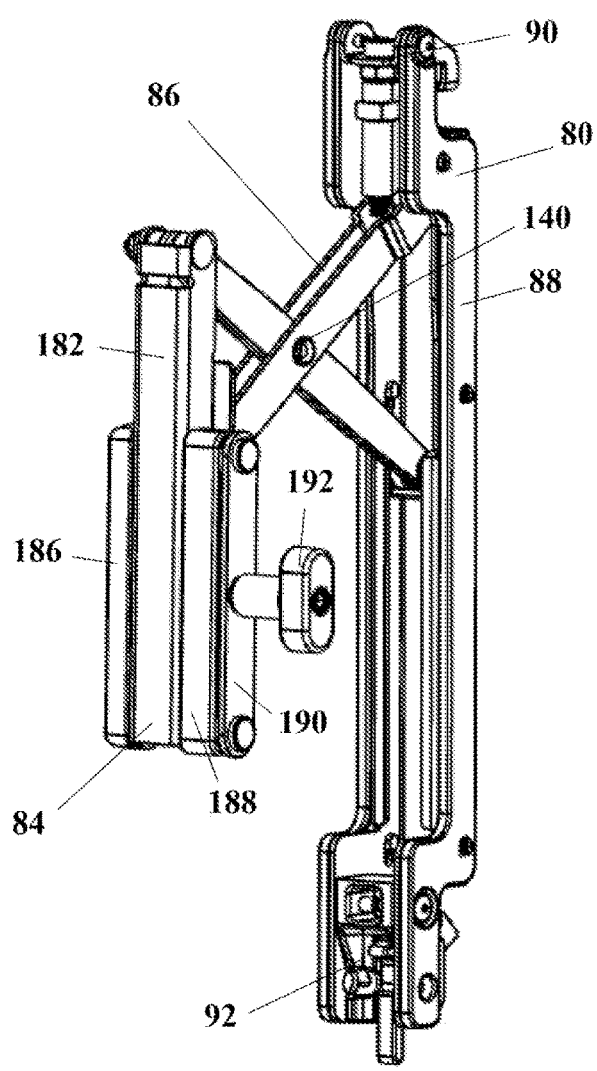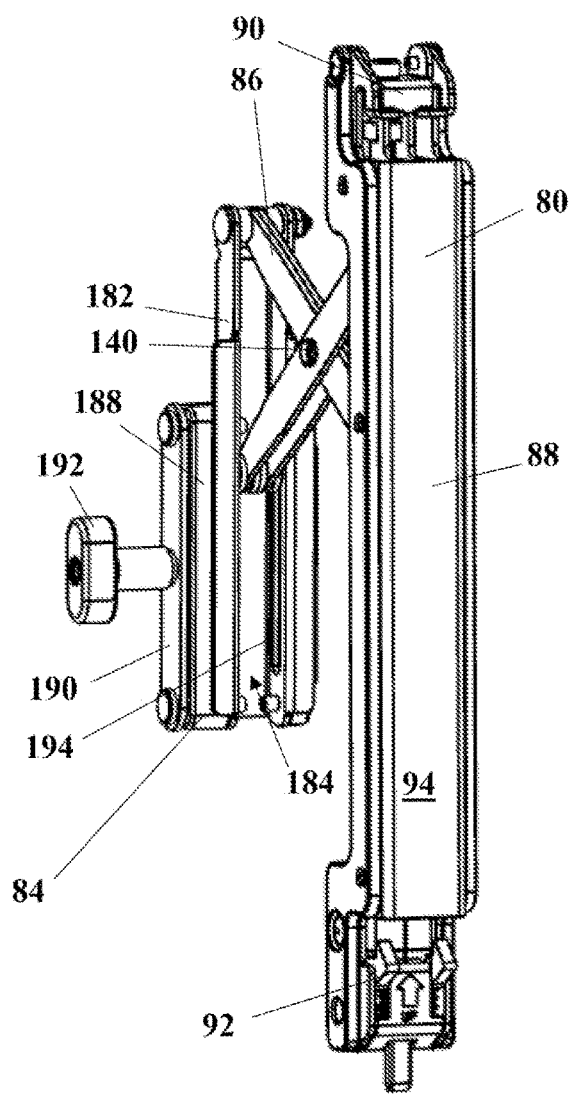
*Fig. 9*  *Fig. 10*

FLAT PANEL DISPLAY MOUNT WITH SWIVEL FEATURE

RELATED APPLICATIONS

The present application claims priority to PCT Application No. PCT/US2021/029978, entitled FLAT PANEL DISPLAY MOUNT WITH SWIVEL FEATURE, filed Apr. 29, 2021, and claims the benefit of U.S. Provisional Patent Application No. 63/017,072, entitled FLAT PANEL DISPLAY MOUNT WITH SWIVEL FEATURE, filed Apr. 29, 2020, said applications being hereby fully incorporated herein by reference in their entirety.

TECHNICAL FIELD

The present application relates to mounts for flat panel electronic display devices, and more specifically, display mounts enabling adjustable positioning of a mounted flat panel electronic display device.

BACKGROUND

Mounts for attaching a flat panel television or monitor to a vertical surface such as a wall are well-known. For example, U.S. Pat. No. 8,456,808 discloses a mount for a television or monitor having a wall plate and a pair of display mount brackets, said patent being owned by the owner of the present invention and hereby fully incorporated herein by reference. As depicted in prior art FIG. 1a, mount 20 generally includes wall bracket 22 and display mount brackets 24. Wall bracket 22 generally includes upper rail 26, lower rail 28, and side connectors 30. Display mount brackets 24 each generally include engaging bracket 32 and display interface portion 34. Engaging bracket 32 has hook 36 which hooks over top flange 38 of upper rail 26, and lower engaging portion 40 which is received on bottom flange 42 of lower rail 28 to secure the display mount bracket to the wall bracket. Display interface portion 34 is operably coupled to engaging bracket 32 so as to enable a television or monitor attached to display interface portion 34 to be selectively positioned relative to the wall.

While such mounts can securely mount a display device and can offer limited positioning of a display, a drawback is that the display cannot be laterally swiveled relative to the wall so as to enable the plane of the viewing screen to be turned to the side. Such adjustability is desirable if needed to orient the screen toward a portion of the audience, or to minimize glare or direct light on the screen. What is needed is a wall mount for a television or monitor having swivel adjustability.

SUMMARY

Embodiments of the present invention address the need for a wall mount having swivel adjustability. According to embodiments, the wall mount includes a wall attachment assembly with spaced apart top and bottom rails. A pair of display mount assemblies hang from the wall attachment assembly and attach to a television or other electronic display such as a computer monitor. The display mount brackets include an engaging assembly, a display mount member, a scissors assembly, and a carrier assembly. The engaging assembly has hooks and a swivel guide engaged with the top rail of the wall attachment assembly, and a latch assembly engaged with the bottom rail of the wall attachment assembly. The swivel guide and a contact portion of the latch assembly enable the display mount assemblies to swivel or pivot about a vertical axis relative to the wall attachment assembly. This enables an attached television or monitor to be laterally swiveled relative to the wall.

In an embodiment, a mount for an electronic display device includes a wall attachment assembly including a top rail and a bottom rail spaced apart from the top rail, and a display mount assembly. The display mount assembly includes an engaging assembly having a swivel guide engaged with the top rail of the wall attachment assembly and a latch assembly engaged with the bottom rail of the wall attachment assembly. The swivel guide and the latch assembly enable the display mount assembly to pivot about a vertical axis relative to the wall attachment assembly. The mount further includes a display receiving member adapted to receive the electronic display device and operably coupled to the engaging assembly.

In an embodiment, the mount further includes a scissors assembly operably coupling the display receiving member and the engaging assembly, or a vertical positioning assembly. The engaging assembly can include a pair of hooks engaged with the top rail of the wall attachment assembly, and the latch assembly can have a pair of selectively operable latch hooks.

In an embodiment, the swivel guide can have a curved guide portion. The wall attachment assembly may include a pair of spaced apart side connectors coupling the top rail and the bottom rail.

In embodiments, the display mount assembly is pivotable through a range of about 20 degrees relative to the vertical axis. The display receiving member may be tiltable about a virtual axis disposed forwardly from a display receiving surface of the display receiving member.

In further embodiments, a mount for an electronic display device includes a wall attachment assembly having a top rail and a bottom rail spaced apart from the top rail, the top rail presenting an upturned flange and the bottom rail presenting a downturned flange. The mount further includes a pair of display mount assemblies, each of the display mount assemblies having an engaging assembly including a swivel guide engaged with the upturned flange of the top rail of the wall attachment assembly and a latch assembly engaged with the downturned flange of the bottom rail of the wall attachment assembly. The swivel guide and the latch assembly enable each of the display mount assemblies to pivot about a vertical axis relative to the wall attachment assembly. The mount can also include a display receiving member adapted to receive the electronic display device, a carrier assembly operably coupled to the display receiving member, a scissors assembly operably coupling the engaging assembly and the carrier assembly.

In an embodiment, each display mount assembly includes a vertical positioning assembly, and may include a pair of hooks engaged with the top rail of the wall attachment assembly, a pair of selectively operable latch hooks. The swivel guide may include a curved guide portion. The wall attachment assembly can include a pair of spaced apart side connectors coupling the top rail and the bottom rail.

In embodiments, the display mount assembly is pivotable through a range of about 20 degrees relative to the vertical axis. In other embodiments, the display mount assembly can be pivotable through a range of up to 90 degrees relative to the vertical axis. The display receiving member may be tiltable about a virtual axis disposed forwardly from a display receiving surface of the display receiving member.

The above summary is not intended to describe each illustrated embodiment or every implementation of the subject matter hereof. The figures and the detailed description that follow more particularly exemplify various embodiments.

BRIEF DESCRIPTION OF THE DRAWINGS

The subject matter hereof may be more completely understood in consideration of the following detailed description of various embodiments in connection with the accompanying figures, in which:

FIG. 6 is a partial top isometric view of the wall attachment assembly and display mount assembly of FIG. 1;

FIG. 7 is a partial top isometric view of the upper engaging assembly of the display mount assembly of FIG. 2, with the body depicted in phantom for clarity;

FIG. 8 is a partial top isometric view of the display mount assembly of FIG. 7, with the upper swivel guide engaged with the top rail of the wall attachment assembly;

FIG. 9 is a front isometric view of the display mount assembly of FIG. 2 with the display receiving member omitted;

FIG. 10 is a rear isometric view of the display mount assembly of FIG. 2 with the display receiving member omitted;

Figure 1:
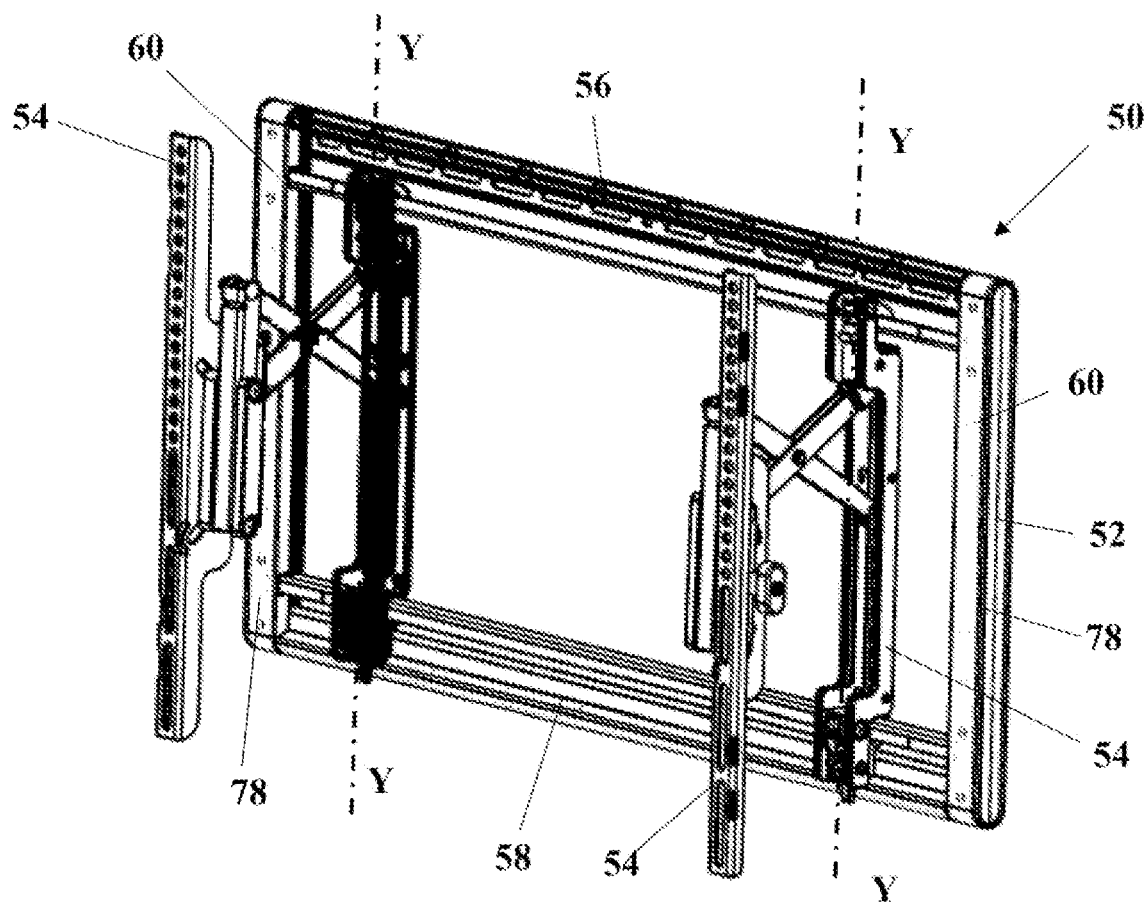
FIG. 1 is a front isometric view of a display mount according to an embodiment of the invention.
Figure 1A:
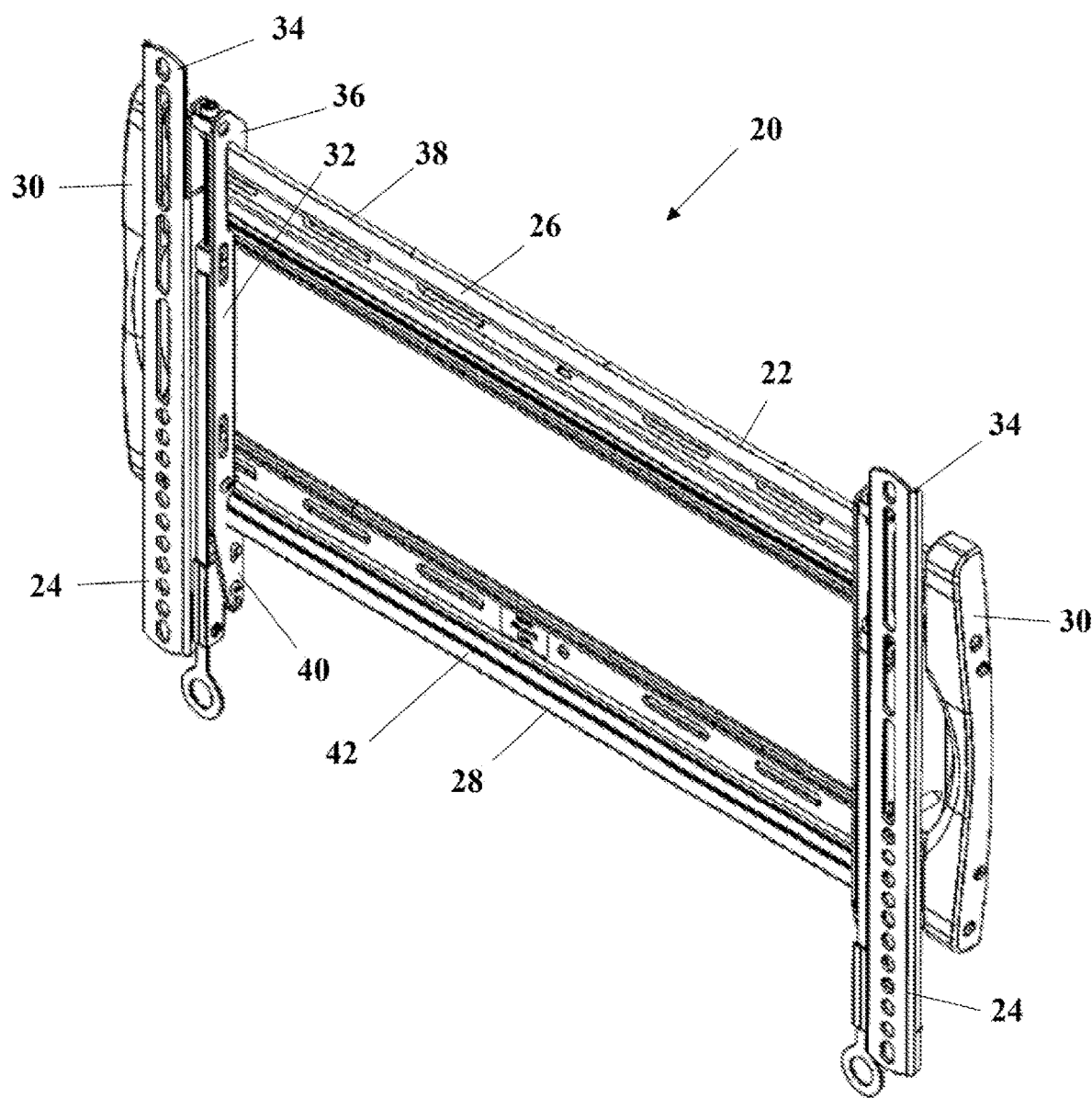
FIG. 1a is a front isometric view of a prior art display mount.
Figure 2:
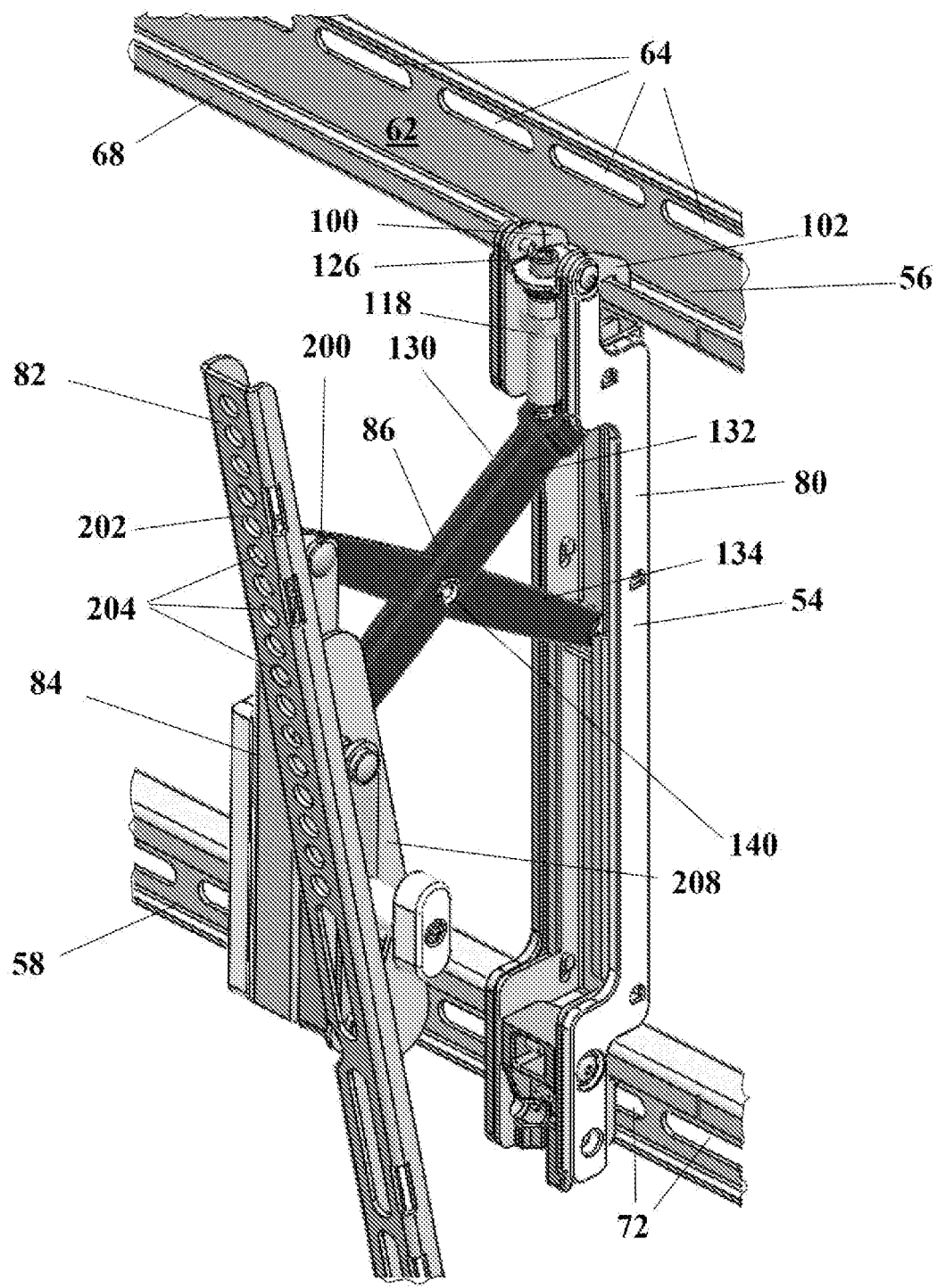
FIG. 2 is a partial front isometric view of the wall attachment assembly and a display mount assembly of the mount of FIG. 1, depicting the display mount assembly in a tilted position.
Figure 3:
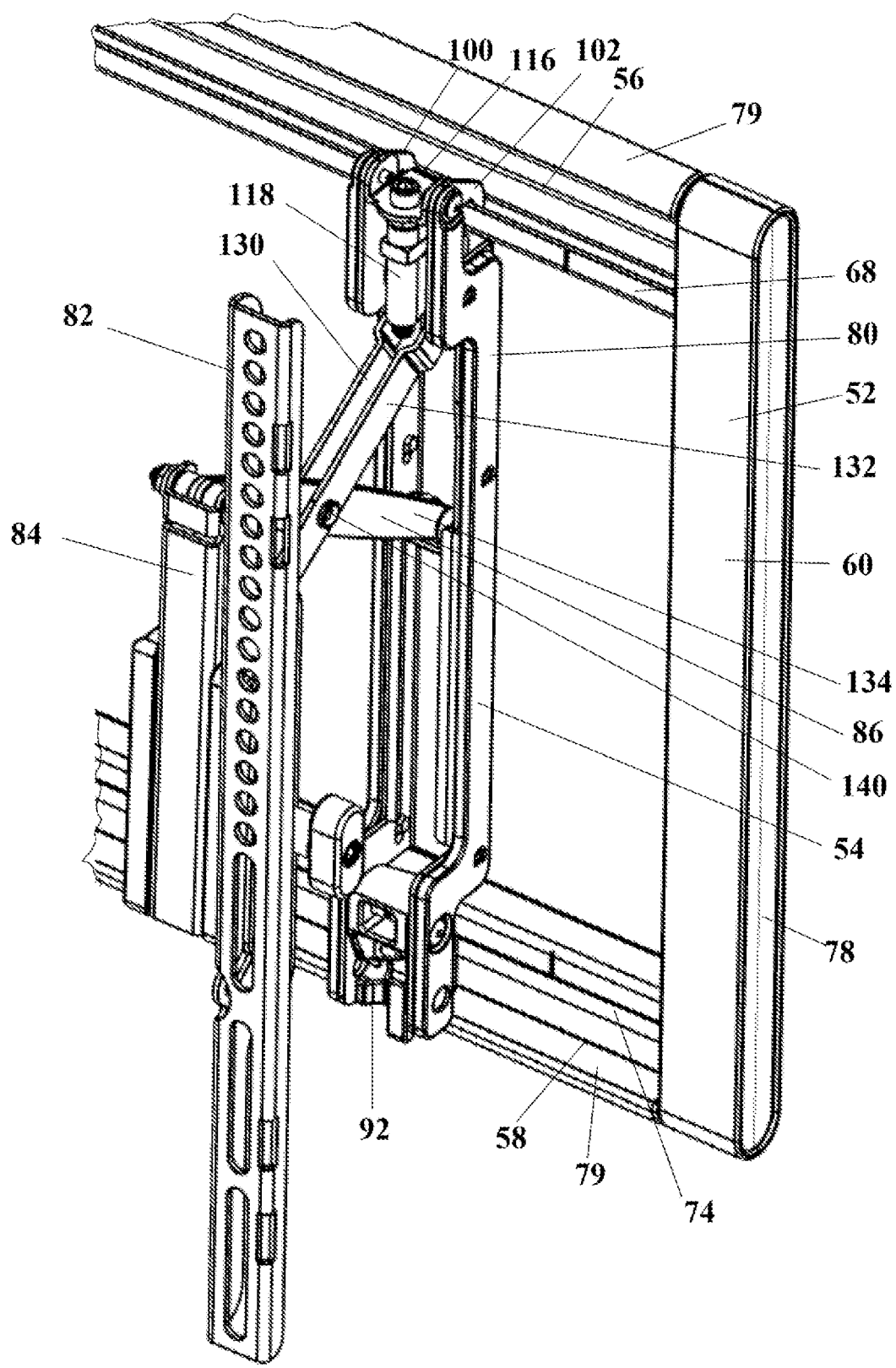
FIG. 3 depicts the display mount assembly of FIG. 2 in a non-tilted position.
Figure 4:
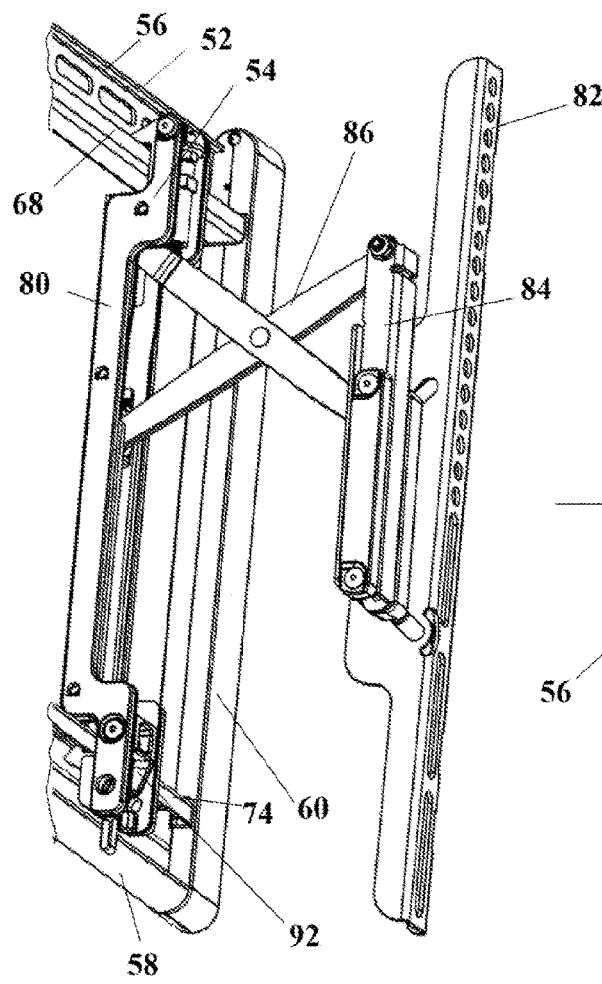
FIG. 4 is a partial isometric view of the wall attachment assembly and display mount assembly of FIG. 2 viewed from the bottom.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

A mount 50 according to an embodiment of the invention is depicted in FIGS. 1, and 2-19. Mount 50 generally includes wall attachment assembly 52 and display mount assemblies 54. As depicted, wall attachment assembly 52 generally includes top rail 56, bottom rail 58, and side connectors 60. Top rail 56 has back plate 62 defining apertures 64 for receiving fasteners (not depicted) to attach wall attachment assembly 52 to wall 66, and projecting upturned flange 68. Bottom rail 58 has back plate 70 defining apertures 72 for receiving fasteners (not depicted) to attach wall attachment assembly 52 to wall 66, and projecting downturned turned flange 74. Side connectors 60 extend between, and couple, top rail 56 and bottom rail 58 at each lateral end, and generally include connector bar 76, and decorative cover 78. Decorative covers 78 can be similarly fitted over top rail 56 and bottom rail 58.

Each display mount assembly 54 generally includes engaging assembly 80, display receiving member 82, carrier assembly 84, and scissors assembly 86. Engaging assembly 80 generally includes body 88, upper engaging assembly 90 and latch assembly 92, Body 88 includes back plane 94 and forwardly projecting flanges 96, 98. Hooks 100, 102, are defined at upper ends 104, 106, of flanges 96, 98, respectively. Flanges 96, 98, further define vertical slots 108, 110, and inwardly turned flanges 112, 114, respectively.

Upper engaging assembly 90 is fitted between hooks 100, 102, and generally includes upper swivel guide 116 and vertical positioning assembly 118. Upper swivel guide 116 has curved guide portion 119, and is riveted to body 88 with rivets 120, 122.

Vertical positioning assembly 118 generally includes body 124 and positioning screw 126. Body 124 hangs from nut 128 and vertically slides relative to body 88 as positioning screw 126 is turned—vertically upward as positioning screw 126 is turned clockwise, and vertically downward as positioning screw 126 is turned counter-clockwise as viewed from above.

Figure 12:
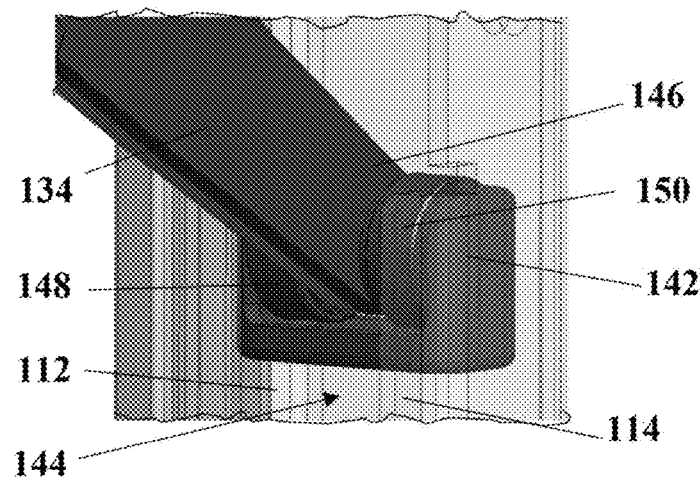
FIG. 12 is a front isometric view of the lower connection of the scissor arm assembly with the body, with the body depicted in phantom for clarity.

Scissors assembly 86 generally includes first arms 130, 132, and second arm 134. First arms 130, 132, are pivotally attached to body 124 with pivot pins 138, which are in turn slidably received in slots 108, 110. The vertical position of pins 138, can be vertically shifted relative to body 88 as body 124 is vertically translated with positioning screw 126. First arms 130, 132, and second arm 134 are pivotally attached together with pivot 140. Slide block 142 is slidably received in channel 144 formed by body 88 and is horizontally retained by inwardly turned flanges 112, 114 as depicted in FIG. 12. Bottom end 146 of second arm 134 is pivotally attached to slide block 142. Bearings 148, 150, roll in channel 144 as slide block 142 slides vertically in channel 144.

Figure 13:
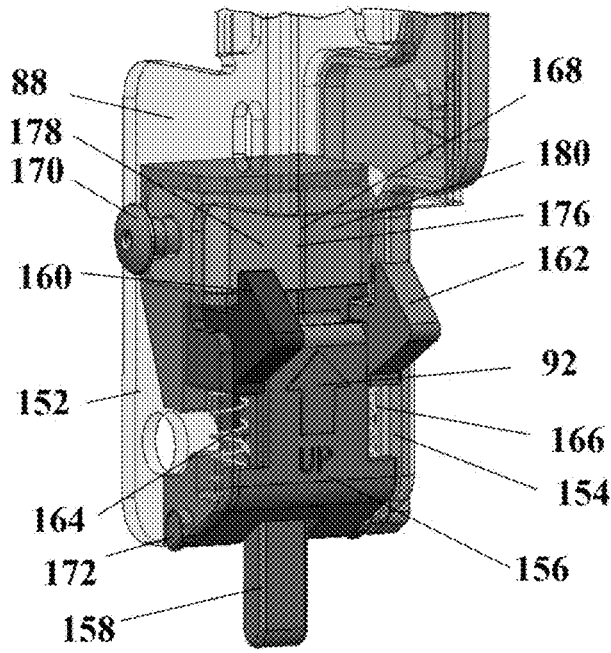
FIG. 13 is a rear isometric view of the latch assembly of the display mount assembly, with the body depicted in phantom for clarity.
Figure 14:
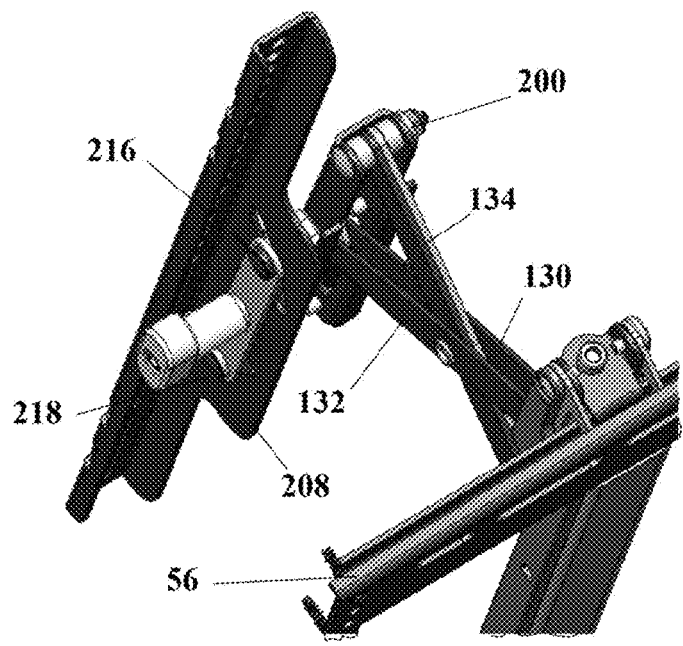
FIG. 14 is a partial top isometric view of one of the display mount assemblies of the mount of FIG. 1.

As depicted in FIG. 13, latch assembly 92 is received between lower flanges 152, 154, of body 88 and generally includes latch body 156, latch control 158, latch hooks 160, 162, biasing springs 164, 166, and contact member 168. Latch body 156 is secured in place with rivets 170 and locating tabs 172, which fit into locating notches 174 in body 88. Biasing springs 164, 166, bias latch hooks 160, 162, upward. Latch control 158 is movably coupled to latch body 156, and is operable to shift latch hooks 160, 162, downward against the bias of biasing springs 164, 166. Contact member 168 defines ridge 176 with angled flats 178, 180, on either side.

Carrier assembly 84 generally includes carrier body 182, which defines channel 184, spacers 186, 188, clamp 190, and friction control 192. Carrier body 182 further defines vertical slots 194. Pivot pin 196 is slidably received in slots 194, and extends through bearings 198 and first arms 130, 132, so that first arms 130, 132, are pivotally coupled with carrier body 182, and pivot pin is vertically slidable in channel 184. Second arm 134 is pivotally attached to carrier body 182 with pivot 200.

Display receiving member 82 presents forwardly facing display mounting surface 202, which defines apertures 204 for receiving fasteners (not depicted) for attaching television or display 206. Flange 208 extends rearwardly, and defines slots 210, 212. Slots 210, 212, may be positioned along the circumference of a circle 214. Flange 208 is clamped between spacer 188 and clamp 190 with pins 216, 218, extending through slots 210, 212, respectively. Pins 216, 218 slide in slots 210, 212, enabling display receiving member 82 to tilt about a virtual horizontal axis 220 positioned at the center of circle 214 and in front of display mounting surface 202. This aspect is described in U.S. Pat. Nos. 8,490,934 and 8,235,342, said applications being owned by the owner of the present application and hereby fully incorporated herein by reference. Display receiving member 82, and an attached television or display 206, can be tilted relative to wall 66 by grasping the top or bottom of the television or display 206 and pushing or pulling until the television or display 206 is in a desired tilt position. Friction control 192 can be tightened or loosened to adjust the friction holding display receiving member 82 in position.

Figure 5:
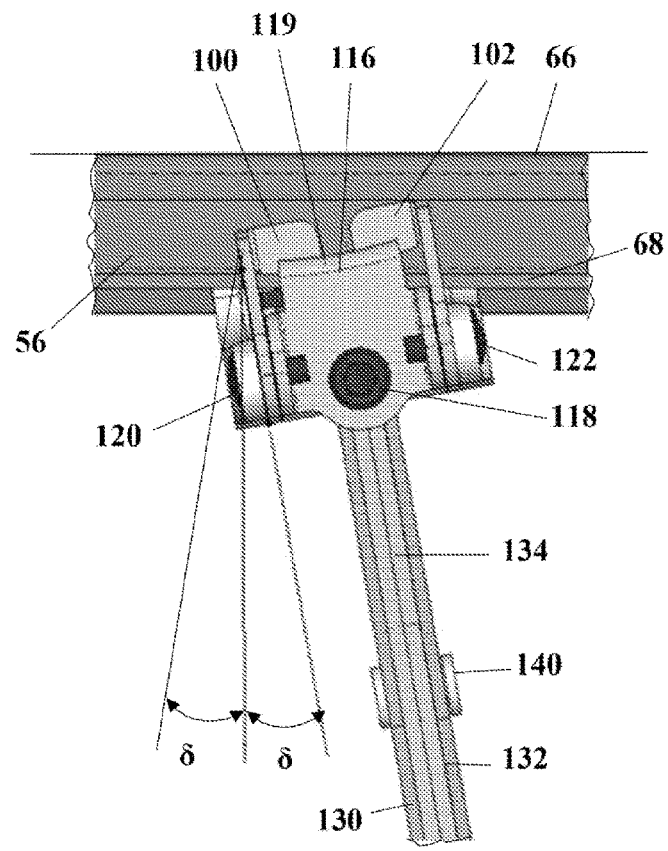
FIG. 5 is a top plan view of the wall attachment assembly and display mount assembly of FIG. 2, depicting a range of swiveling travel.
Figure 11:
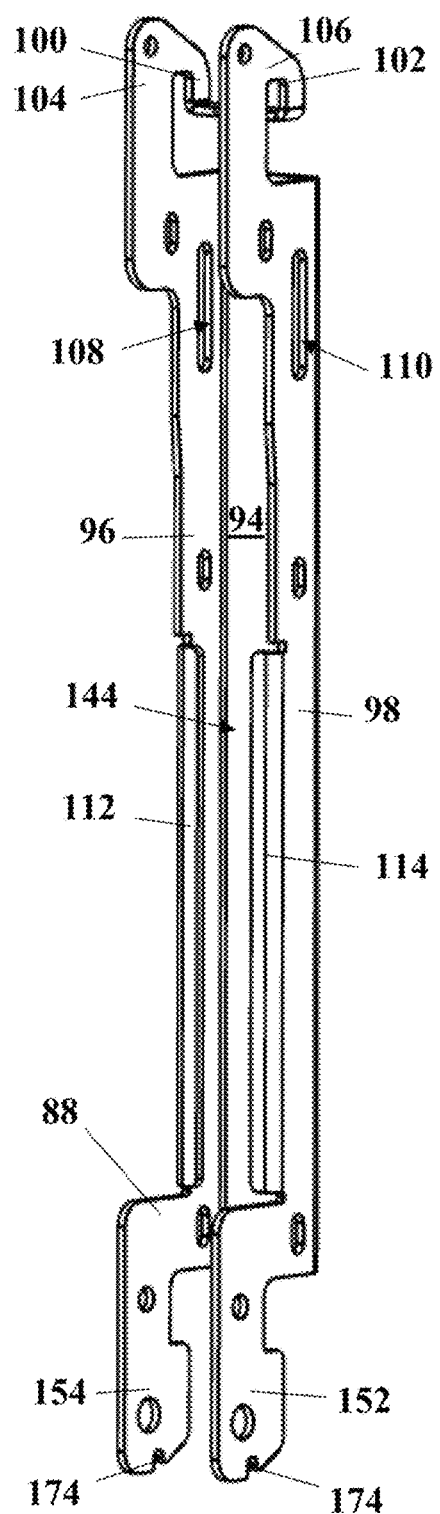
FIG. 11 is a front isometric view of the body of the display mount assembly of FIGS. 9 and 10.
Figure 15:
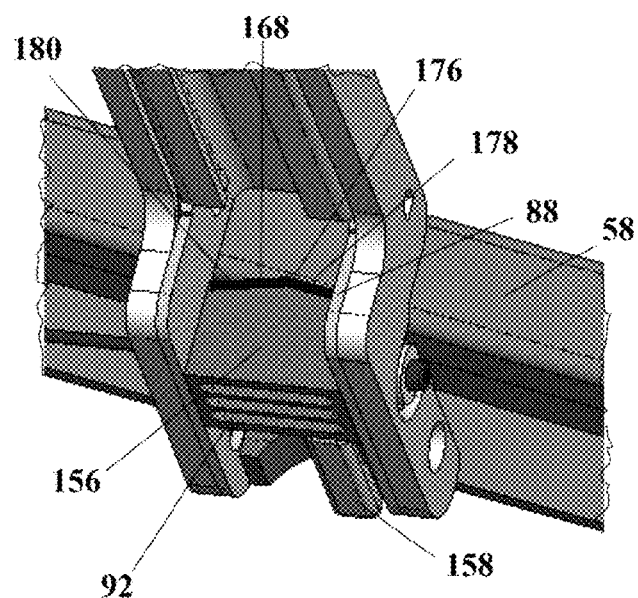
FIG. 15 is a front isometric view of the latch assembly engaged with the bottom rail and in a swiveled position.
Figure 16:
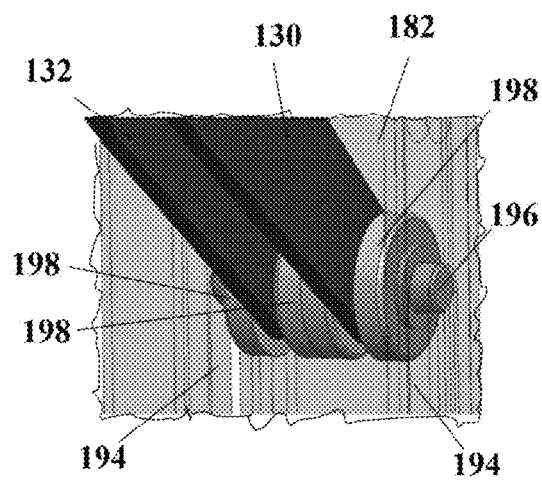
FIG. 16 is a rear isometric view of the lower scissor arm assembly connection between the carrier and the scissor arm, with the carrier depicted in phantom for clarity.
Figure 17:
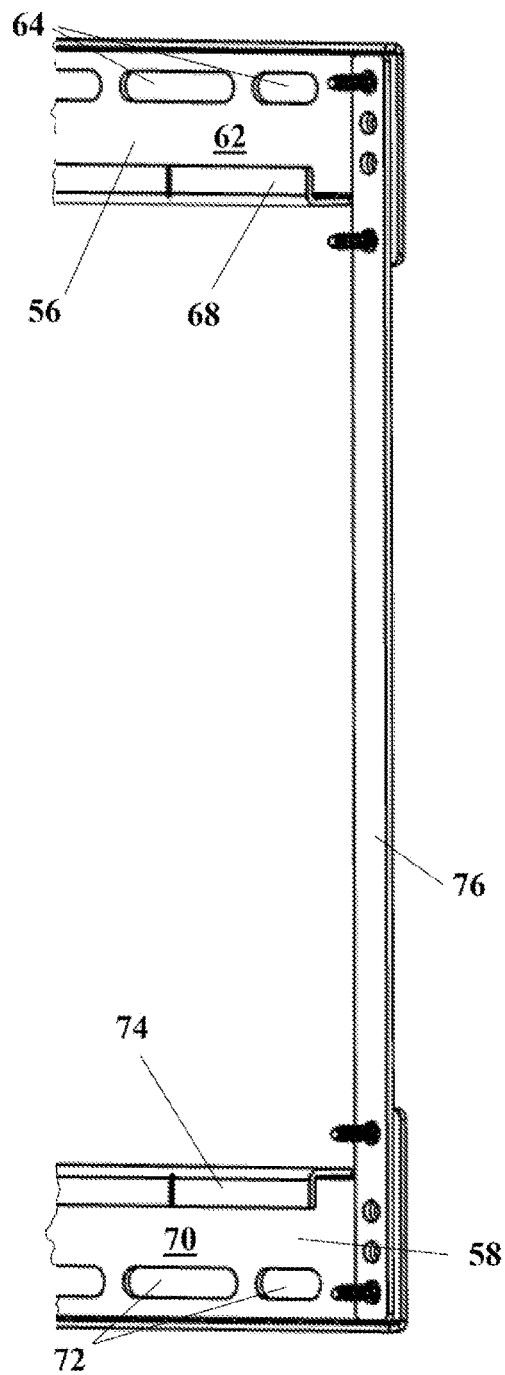
FIG. 17 is a partial front isometric view of the wall attachment assembly of the mount of FIG. 1.
Figure 18:
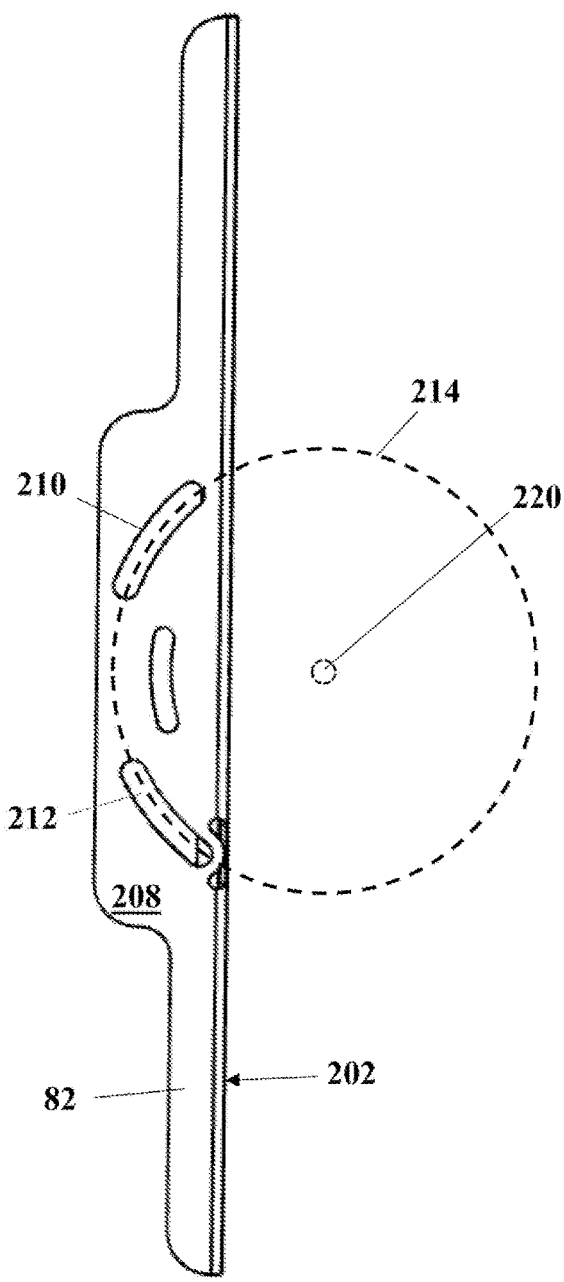
FIG. 18 is a side elevation view of one of the display interface members of the mount of FIG. 1.

In use, wall attachment assembly 52 is mounted to wall 66, and television or display 206 is attached to display receiving members 82. Hooks 100, 102, of each display mount assembly 54 are hooked over upturned flange 68, with curved guide portion 119 behind upturned flange 68 as depicted in FIG. 5. Latch assembly 92 is advanced toward lower rail 58. Latch hooks 160, 162, bear against downturned flange 74 and are pressed downward against the bias of biasing springs 164, 166. Once clear of downturned flange 74, biasing springs 164, 166, return latch hooks 160, 162, upward, latching display mount assemblies 54 in place on wall attachment assembly 52. Ridge 176 of contact member 168 bears against downturned flange 74 as depicted in FIG. 15. Television or display 206 can be pulled away from or pushed toward wall 66 through the action of scissors assemblies 86. The vertical position of each scissors assembly 86, and thereby each side of television or display 206, can be separately adjusted by turning positioning screws 126 in order to level television or display 206. Television or display 206 can be tilted to a desired position about horizontal axis 220 by grasping the top or bottom of the television or display 206 and pushing or pulling.

Figure 19:
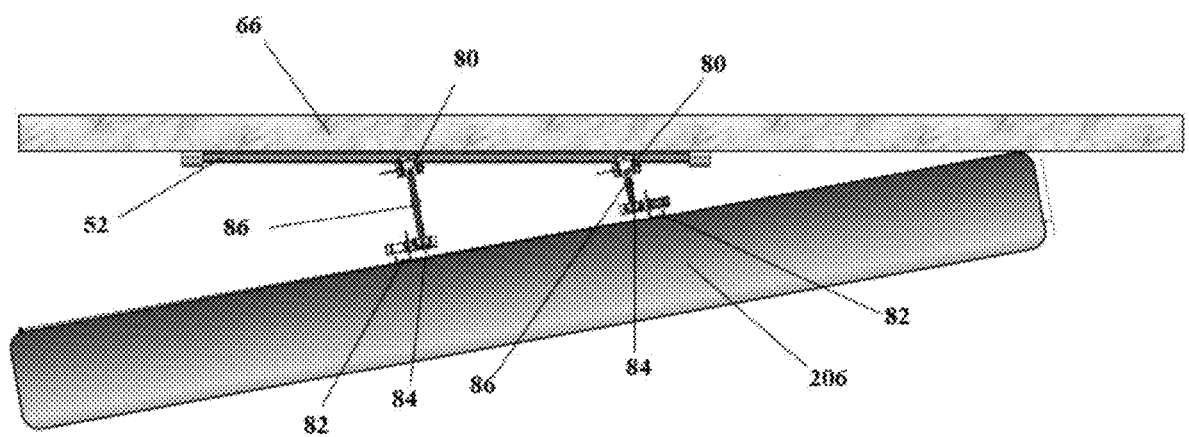
FIG. 19 is a top plan view of the mount of FIG. 1 attached to a wall and with an attached television swiveled to the side.

Finally, television or display 206 can be swiveled relative to wall 66 as depicted in FIGS. 5 and 19. Curved guide portion 119 can roll on upturned flange 68 and contact member 168 can rock on ridge 176 against downturned flange 74, enabling each engaging assembly 80 to rotate about a vertical axis Y-Y relative to wall attachment assembly 52 and wall 66. Each display mount assembly 54 can thereby be swiveled (pivoted) to each side through an angle δ relative to perpendicular with wall 66 as depicted in FIG. 5. In some embodiments, angle δ can be about 10 degrees, for a total range of about 20 degrees of pivoting relative to the vertical axis. In other embodiments, especially for smaller televisions, angle δ can be up to about 45 degrees, for a total range of about 90 degrees of pivoting relative to the vertical axis.

Television or display 206 can be dismounted from wall 66 by pressing upward on latch controls 158 against the bias of biasing springs 164, 166, causing latch hooks 160, 162, to move clear of downturned flange 74. The bottom ends of display mount assemblies 54 can be pulled away from bottom rail 58. Hooks 100, 102, can then be lifted clear of upturned flange 68 to dismount television or display 206.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:
1. A mount for an electronic display device, the mount comprising:
   a wall attachment assembly including a top rail and a bottom rail spaced apart from the top rail, the top rail presenting an upturned flange and the bottom rail presenting a downturned flange; and
   a display mount assembly comprising:
      an engaging assembly comprising:

a body presenting an upper end having a pair of spaced-apart hooks and an opposing lower end;

an upper engaging assembly coupled to the upper end of the body, the upper engaging assembly including a swivel guide having a curved guide portion;

a latch assembly coupled to the lower end of the body, the latch assembly having a pair of spaced-apart latch hooks and a contact member;

wherein the spaced-apart hooks of the body hook over the upturned flange of the top rail and the spaced-apart latch hooks of the latch assembly hook under the downturned flange of the bottom rail, the curved guide portion of the swivel guide of the upper engaging assembly contacting the upturned flange and the contact member of the latch assembly engaging the downturned flange, such that the display mount assembly is pivotable about a vertical axis relative to the wall attachment assembly; and a display receiving member adapted to receive the electronic display device and operably coupled to the body.

2. The mount of claim 1, further comprising a scissors assembly operably coupling the display receiving member and the body.

3. The mount of claim 1, wherein the display mount assembly includes a vertical positioning assembly.

4. The mount of claim 1, wherein the spaced-apart latch hooks of the latch assembly are selectively operable.

5. The mount of claim 1, wherein the wall attachment assembly includes a pair of spaced-apart side connectors coupling the top rail and the bottom rail.

6. The mount of claim 1, wherein the display mount assembly is pivotable through a range of about 20 degrees relative to the vertical axis.

7. The mount of claim 1, wherein the display receiving member is tiltable about a virtual axis disposed forwardly from a display receiving surface of the display receiving member.

8. A mount for an electronic display device, the mount comprising:

a wall attachment assembly including a top rail and a bottom rail spaced apart from the top rail, the top rail presenting an upturned flange and the bottom rail presenting a downturned flange; and a pair of display mount assemblies, each of the display mount assemblies comprising:

an engaging assembly comprising:

a body presenting an upper end having a pair of spaced-apart hooks and an opposing lower end;

an upper engaging assembly coupled to the upper end of the body, the upper engaging assembly including a swivel guide having a curved guide portion;

a latch assembly coupled to the lower end of the body, the latch assembly having a pair of spaced-apart latch hooks and a contact member;

wherein the spaced-apart hooks of the body hook over the upturned flange of the top rail and the spaced-apart latch hooks of the latch assembly hook under the downturned flange of the bottom rail, the curved guide portion of the swivel guide of the upper engaging assembly contacting the upturned flange and the contact member of the latch assembly engaging the downturned flange, such that each of the display mount assemblies is pivotable about a respective vertical axis relative to the wall attachment assembly;

a display receiving member adapted to receive the electronic display device;

a carrier assembly operably coupled to the display receiving member; and a scissors assembly operably coupling the body and the carrier assembly.

9. The mount of claim 8, wherein each display mount assembly includes a vertical positioning assembly.

10. The mount of claim 8, wherein the wall attachment assembly includes a pair of spaced-apart side connectors coupling the top rail and the bottom rail.

11. The mount of claim 8, wherein each display mount assembly is pivotable through a range of about 20 degrees relative to the respective vertical axis.

12. The mount of claim 8, wherein each display receiving member is tiltable about a virtual axis disposed forwardly from a display receiving surface of the display receiving member.

* * * * *